(12) United States Patent
Ho

(10) Patent No.: US 10,973,296 B2
(45) Date of Patent: *Apr. 13, 2021

(54) CARRYING BAG CAPABLE OF PROLONGING POWER SUPPLY

(71) Applicant: ZGONIC PTY LTD., Victoria (AU)

(72) Inventor: Chih Feng Ho, Taipei (TW)

(73) Assignee: ZGONIC PTY LTD., Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,477

(22) Filed: Jul. 6, 2018

(65) Prior Publication Data
US 2020/0008548 A1    Jan. 9, 2020

(51) Int. Cl.
| | | |
|---|---|---|
| *A45C 15/00* | (2006.01) | |
| *A45C 9/00* | (2006.01) | |
| *A45C 13/02* | (2006.01) | |
| *H02J 7/00* | (2006.01) | |
| *G06F 1/16* | (2006.01) | |
| *H02J 7/02* | (2016.01) | |

(52) U.S. Cl.
CPC ............... *A45C 15/00* (2013.01); *A45C 9/00* (2013.01); *A45C 13/02* (2013.01); *G06F 1/1637* (2013.01); *G06F 1/1656* (2013.01); *H02J 7/0042* (2013.01); *H02J 7/025* (2013.01); *A45C 2013/025* (2013.01); *A45C 2200/15* (2013.01)

(58) Field of Classification Search
CPC .. A45C 5/14; A45C 9/00; A45C 11/00; A45C 13/00; A45C 13/02; A45C 13/025; A45C 13/26; A45C 13/28; A45C 15/00; A45C 2013/025; A45C 2200/15; G06F 1/16; G06F 1/1637; G06F 1/1656; G06F 1/1681; H02J 7/00; H02J 7/0042; H02J 7/02; H02J 7/025
USPC ........................................................ 206/320
See application file for complete search history.

(56) References Cited

U.S. PATENT DOCUMENTS

| | | | | |
|---|---|---|---|---|
| 6,145,661 A | * | 11/2000 | Jung ...................... | A45C 13/02 190/102 |
| 6,149,001 A | * | 11/2000 | Akins .................... | A45C 13/26 150/165 |
| 7,881,048 B2 | * | 2/2011 | Daley, III ............. | G06F 1/1628 206/720 |
| 9,936,781 B2 | * | 4/2018 | Lindholm .............. | A45C 11/00 |
| 10,334,928 B1 | * | 7/2019 | Ho ......................... | A45C 15/00 |
| 2005/0206615 A1 | * | 9/2005 | Tanimoto .............. | G06F 1/1616 345/156 |

(Continued)

*Primary Examiner* — Bryon P Gehman
(74) *Attorney, Agent, or Firm* — Browdy and Neimark, PLLC

(57) ABSTRACT

A carrying bag includes a housing having a base wall and an upper wall, and the housing includes a cover panel foldable relative to the upper wall, a base plate is engaged in the housing, a placement rack is foldably attached to the base plate with a hinge device, and the placement rack is foldable relative to the base plate and the housing, and a display is attached to the placement rack and movable relative to the upper wall between an upwardly working position and a downwardly folded storing position. A power supply is engaged in the housing, and a charger is engaged in the housing and electrically connected to the power supply. The housing includes a chamber for receiving a mobile device.

7 Claims, 5 Drawing Sheets

(56) References Cited

U.S. PATENT DOCUMENTS

| | | | |
|---|---|---|---|
| 2006/0007645 A1* | 1/2006 | Chen | G06F 1/1626 361/679.04 |
| 2006/0081489 A1* | 4/2006 | Wheeler | G06F 1/1628 206/320 |
| 2007/0205122 A1* | 9/2007 | Oda | H04M 1/0216 206/320 |
| 2008/0202959 A1* | 8/2008 | Chu | G06F 1/1628 206/320 |
| 2011/0233912 A1* | 9/2011 | Reising | A45C 11/00 281/30 |
| 2013/0015088 A1* | 1/2013 | Wu | A45C 11/00 206/320 |
| 2014/0057246 A1* | 2/2014 | Parks | A45C 9/00 434/382 |

* cited by examiner

CARRYING BAG CAPABLE OF PROLONGING POWER SUPPLY

BACKGROUND OF THE INVENTION

1. Field of the Invention

The present invention relates to a package or suitcase or carrying bag for receiving displayer or mobile device, and more particularly to a package or suitcase or carrying bag for accommodating or receiving a displayer or a mobile device, such as a tablet, a laptop, a screen, a notebook, etc., including a power supply for energizing the displayer or the screen or the mobile device or the like.

2. Description of the Prior Art

Typical mobile devices, such as tablets, screens, laptops, notebooks, etc., may normally be accommodated or received or contained within a fold or package which comprises a base and a cover foldable relative to each other.

However, the fold or package may not be used for accommodating or receiving the other displayers or mobile devices or the like, and have no power supply for energizing the displayer or the screen or the mobile device or the like.

The present invention has arisen to mitigate and/or obviate the afore-described disadvantages of the conventional carrying bag for mobile devices.

SUMMARY OF THE INVENTION

The primary objective of the present invention is to provide a package or suitcase or carrying bag for accommodating or receiving a displayer or a mobile device, such as a tablet, a laptop, a screen, a notebook, etc., including a power supply for energizing the displayer or the screen or the mobile device or the like.

In accordance with one aspect of the invention, there is provided a carrying bag comprising a housing including a base wall and an upper wall, and a cover panel extended from the upper wall and foldable relative to the upper wall and movable toward the upper wall, a base plate engaged in the housing, a placement rack foldably attached to the base plate with a hinge device, and the placement rack being foldable relative to the base plate and the housing, a display attached to the placement rack and movable relative to the upper wall between an upwardly working position and a downwardly folded storing position, a power supply engaged in the housing, and a charger engaged in the housing and electrically connected to the power supply.

The charger includes a charging and/or discharging module electrically connected to the power supply. The charger includes a transmitting module electrically connected to the charging and/or discharging module, and at least one connector. The charger includes a wireless charging unit electrically connected to the power supply.

The housing includes a chamber formed therein and defined by a base wall and the upper wall, a mobile device is selectively receivable and engageable into the chamber of the housing. A connecting cable is connectable to the display and the mobile device.

The housing includes a flap extended from the base wall and foldable relative to the base wall for covering the chamber of the housing selectively, and the housing includes a lock device attached to the cover panel, and a lock member attached to the flap for selectively engaging with the lock device of the cover panel and for coupling the cover panel and the flap together. The housing includes a depression formed in the upper wall for selectively receiving and engaging with the display when the cover panel is folded toward the upper wall.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
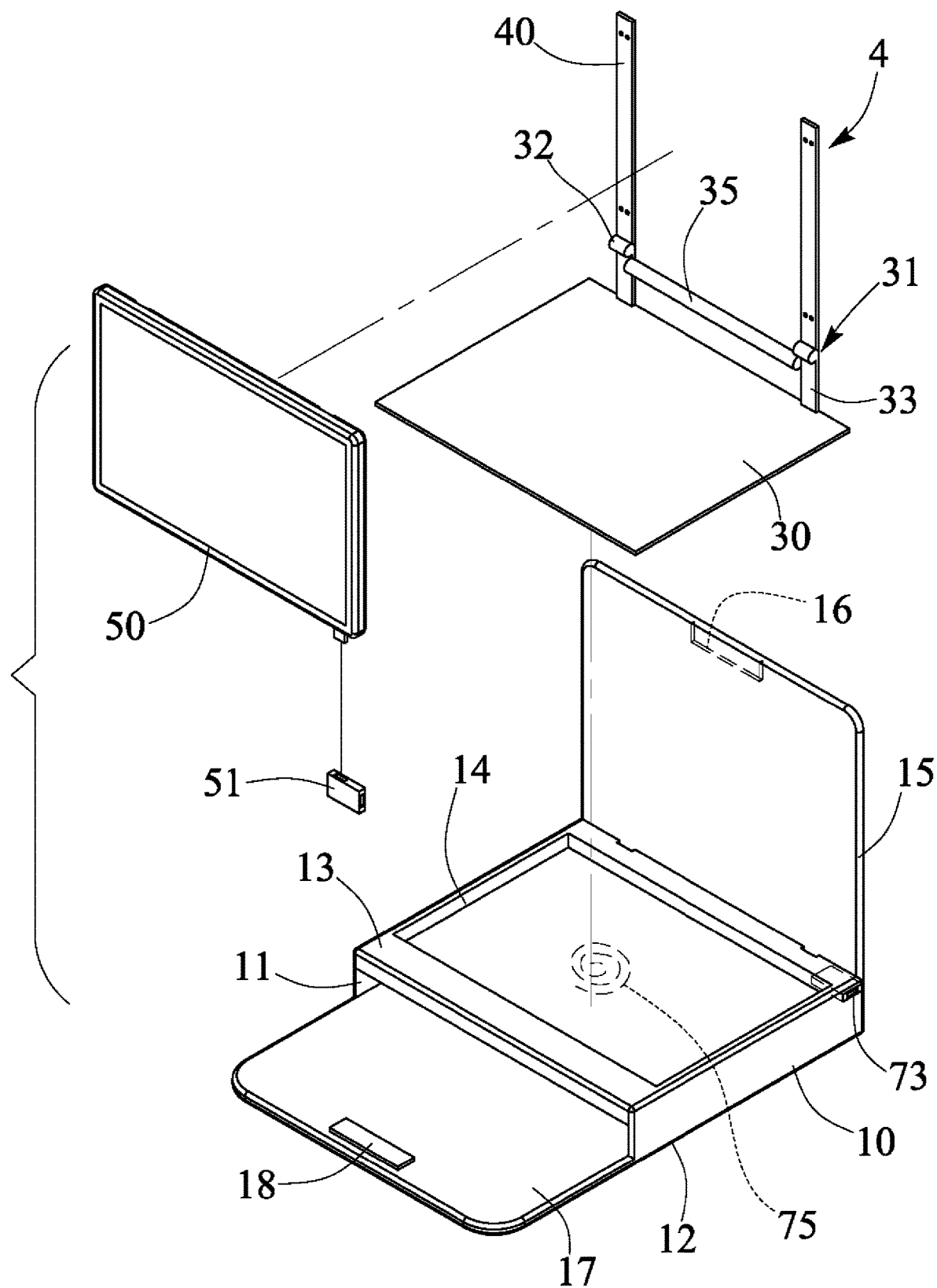
FIG. 1 is a partial exploded view of a carrying bag for mobile device in accordance with the present invention.
Figure 2:
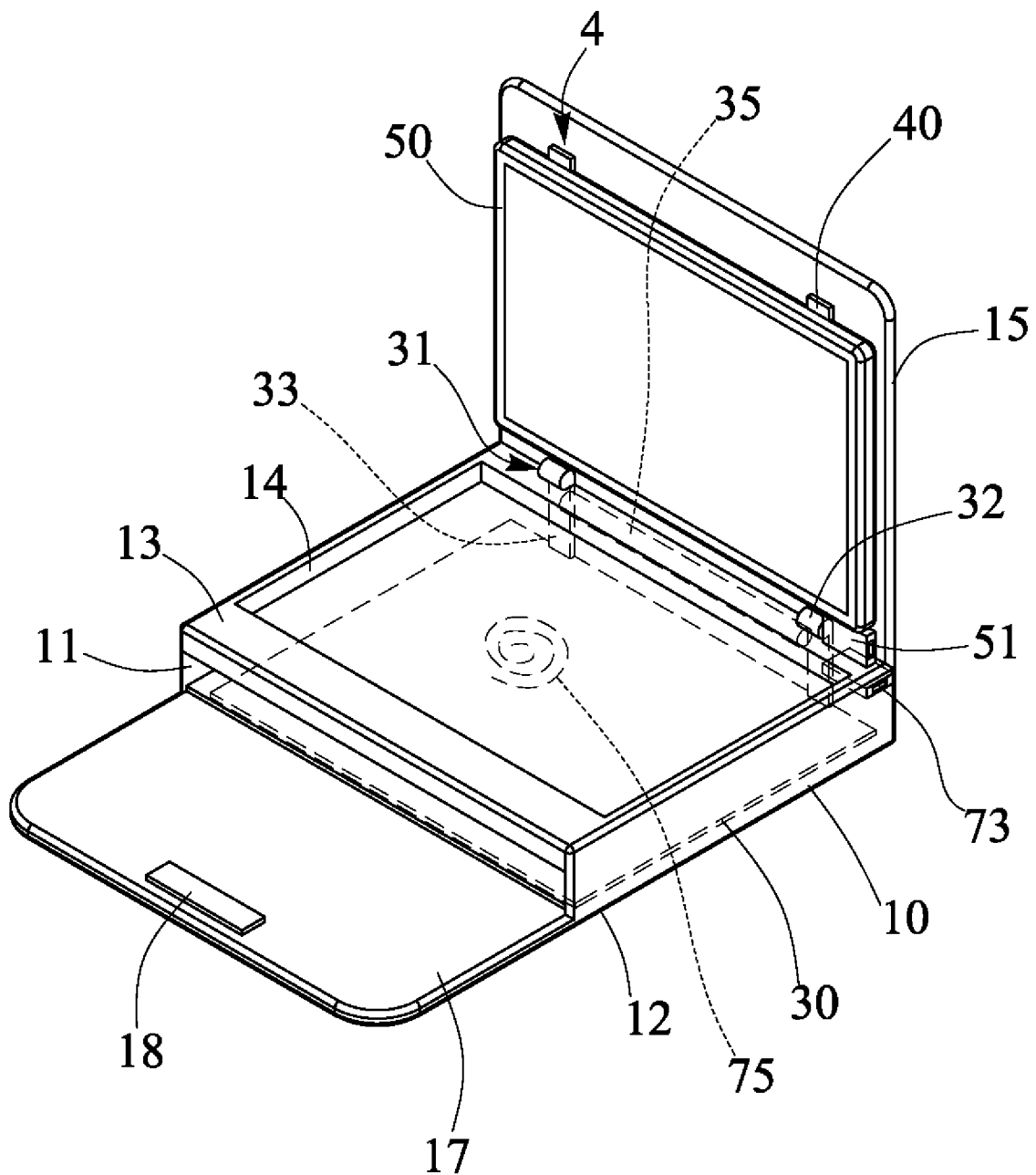
FIG. 2 is a perspective view illustrating the operation of the carrying bag for mobile device.
Figure 3:
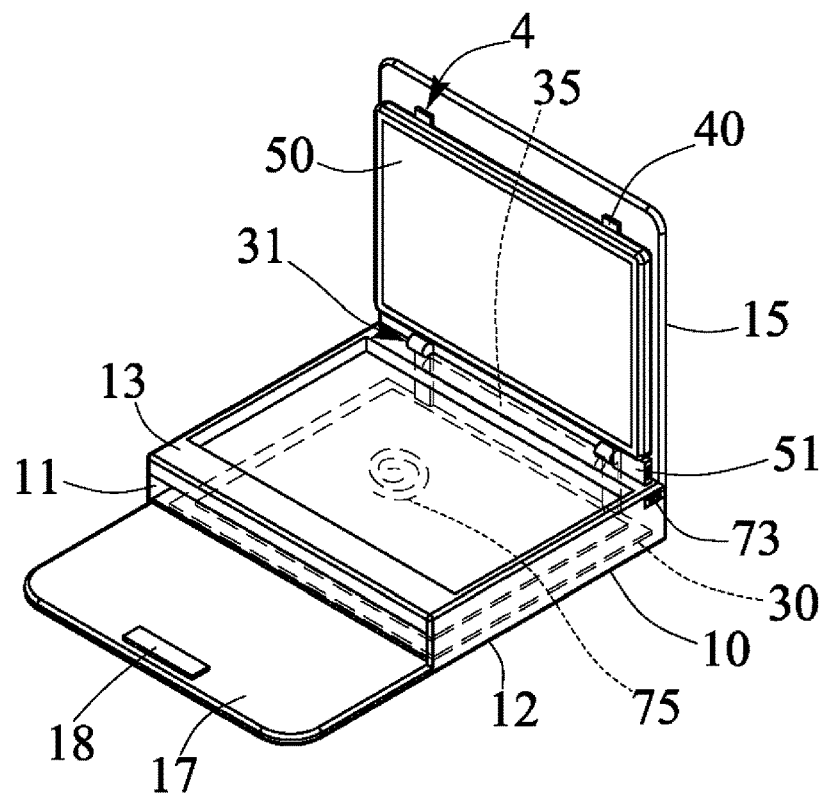
FIG. 3 is another perspective view similar to FIG. 2, illustrating the operation of the carrying bag for mobile device.
Figure 4:
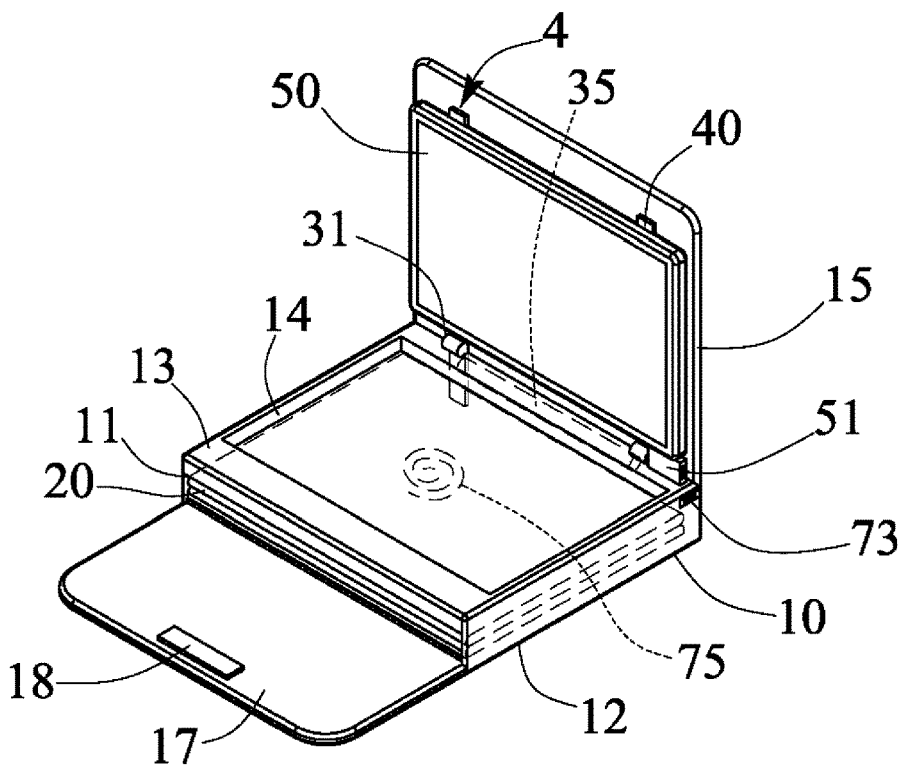
FIG. 4 is a further perspective view similar to FIGS. 2-3, illustrating the operation of the carrying bag for mobile device.

Referring to the drawings, and initially to FIGS. 1-5, a package or container or suitcase or carrying bag for mobile device in accordance with the present invention comprises a carrying bag body or housing 10 including a compartment or chamber 11 formed therein and formed or defined by a bottom or base wall 12 and an upper wall 13, and including a recess or depression 14 formed in the upper wall 13, the depression 14 that is formed in the upper wall 13 may be communicated with or spaced or separated from the chamber 11 of the housing 10. The housing 10 includes a cover panel 15 hinged or extended from the base wall 12 and/or the upper wall 13 and foldable relative to the upper wall 13 and/or foldable or movable toward the upper wall 13 for covering the depression 14 of the upper wall 13 of the housing 10 selectively.

The housing 10 further includes a lock device 16 (FIG. 1), such as a Velcro, a magic sticker or the like attached or mounted or secured to the cover panel 15, and further includes another fold or flap 17 hinged or extended from the base wall 12 and foldable relative to the base wall 12 and/or the upper wall 13, for covering the chamber 11 of the housing 10 selectively. The housing 10 further includes another lock device or lock member 18, such as a Velcro, a magic sticker or the like attached or mounted or secured to the flap 17, for selectively engaging with the lock device 16 of the cover panel 15, and for solidly and stably securing or coupling the cover panel 15 and the flap 17 together. The chamber 11 of the housing 10 may be provided for accommodating or receiving or containing a mobile device 20 (FIGS. 4-6), such as a tablet, a laptop, a screen, a notebook, or the like.

As shown in FIGS. 1-4, a weight member of base plate 30 is received or engaged into the base wall 12 of the housing 10, and disposed or located below the chamber 11 of the housing 10, a placement rack or support device 4 is foldably attached or mounted or secured to the base plate 30 and/or two extensions 33 (FIG. 1) of the base plate 30 with a pivot or hinge device 31 and foldable relative to the base plate 30, for example, the placement rack 4 includes a stay or board or carrier 40 pivotly or foldably attached or mounted or secured to the base plate 30 with a hinge member 32 of the hinge device 31 and foldable relative to the base plate 30, the carrier 40 of the placement rack 4 are contacted or engaged or attached or mounted or secured to the cover panel 15 and foldable or movable in concert with the cover panel 15 relative to the base plate 30 and the base wall 12 and/or the upper wall 13.

A screen or display 50 is attached or mounted or secured to the carrier 40 of the placement rack 4 and foldable or movable relative to the base wall 12 and/or the upper wall 13 between an upwardly opening or working position as shown in FIGS. 2-6, and a downwardly folded storing position. It is preferable that the display 50 is received or engaged into the depression 14 of the upper wall 13 of the housing 10 when the cover panel 15 and the carrier 40 of the placement rack 4 are folded or moved toward the upper wall 13. When or after the mobile device 20 is received or engaged into the chamber 11 of the housing 10 and when the cover panel 15 and the carrier 40 of the placement rack 4 are folded or moved toward the upper wall 13, the flap 17 may be folded relative to the base wall 12 and/or the upper wall 13, and the lock member 18 of the flap 17 may be engaged with the lock device 16 of the cover panel 15, for solidly and stably securing or coupling the cover panel 15 and the flap 17 together and for solidly and stably anchoring or retaining the mobile device 20 within the chamber 11 of the housing 10.

Figure 5:
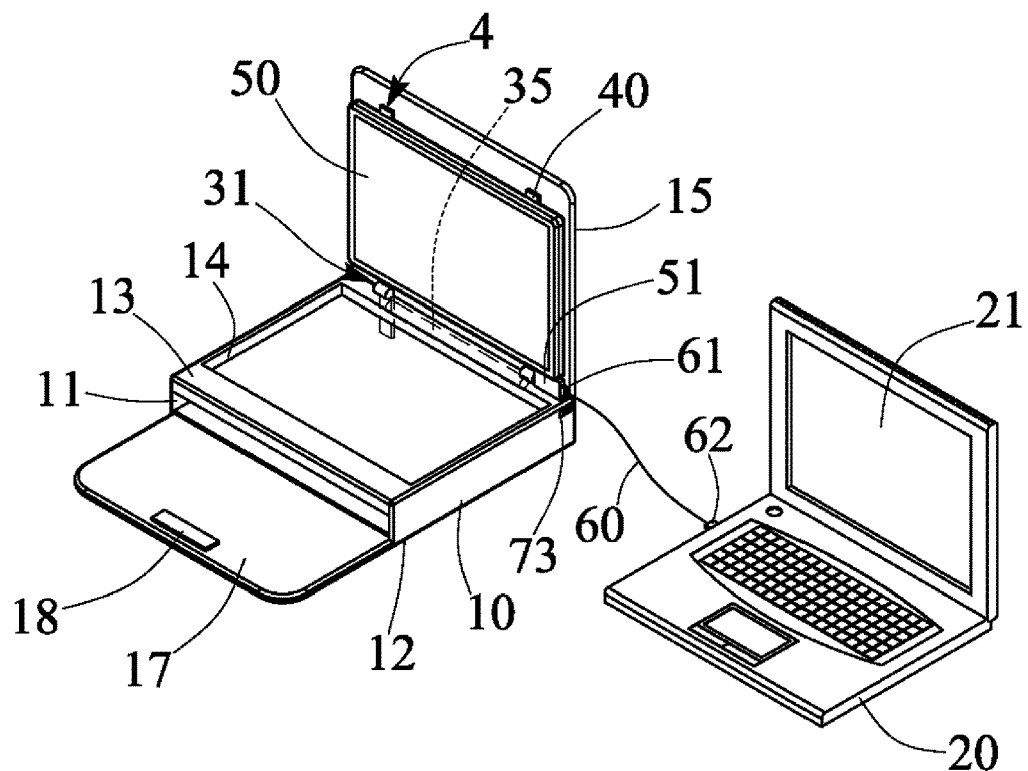
FIG. 5 is a still further perspective view illustrating the operation of the carrying bag for mobile device.
Figure 6:
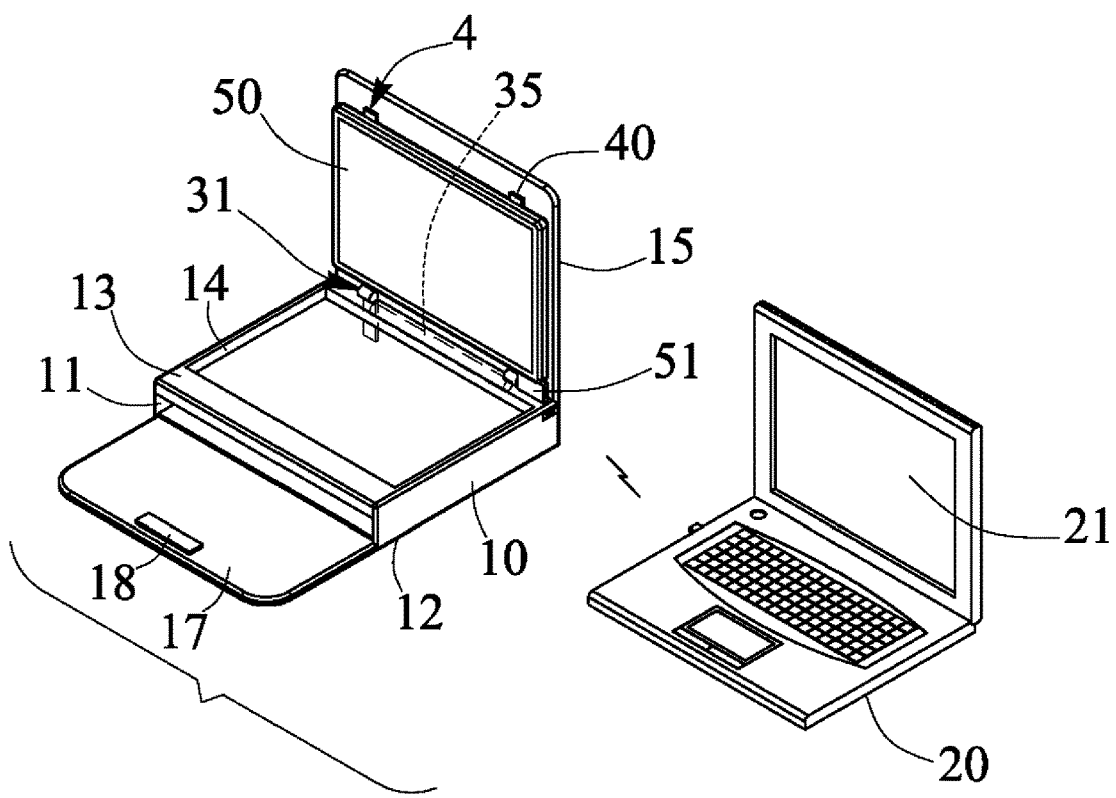
FIG. 6 is a still further perspective and/or exploded view illustrating the operation of the carrying bag for mobile device.

As shown in FIG. 5, when the mobile device 20 is removed or disengaged from the chamber 11 of the housing 10, the mobile device 20 may be electrically connected or coupled to the terminal or connector 51 of the display 50 with a connecting cable 60 and one or more connectors or couplers 61, 62, for allowing the information of the mobile device 20 to be shown in either or both the display 50 and the screen 21 of the mobile device 20. The connector 51 of the display 50 may be selected from a universal serial bus (USB) type C connector, a Miracast, an Airplay, an AiDi, a Chromecast, or a DLNA, or the like. Similarly, the mobile device 20 may also be electrically connected or coupled to the terminal or connector 51 of the display 50 wirelessly, as shown in FIG. 6.

In operation, as shown in FIGS. 2-6, the display 50 and the cover panel 15 and the carrier 40 of the placement rack 4 may be folded relative to the base wall 12 and/or the upper wall 13 upwardly toward the opening or working position for allowing the display 50 reached or operated by the user. After use, the display 50 and the cover panel 15 and the carrier 40 of the placement rack 4 may be folded relative to the base wall 12 and/or the upper wall 13 downwardly toward the upper wall 13 to the folded storing position, for allowing the display 50 to be received or engaged into the depression 14 of the upper wall 13 of the housing 10. After the mobile device 20 is received or engaged into the chamber 11 of the housing 10, the flap 17 may be folded relative to the base wall 12 and/or the upper wall 13, and the lock member 18 of the flap 17 may be engaged with the lock device 16 of the cover panel 15, for solidly and stably securing or coupling the cover panel 15 and the flap 17 together and for solidly and stably anchoring or retaining the mobile device 20 within the chamber 11 of the housing 10.

Figure 7:
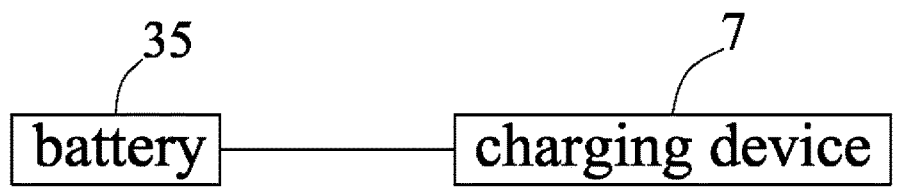
FIG. 7 is a block diagram illustrating the charging device of the carrying bag.
Figure 8:
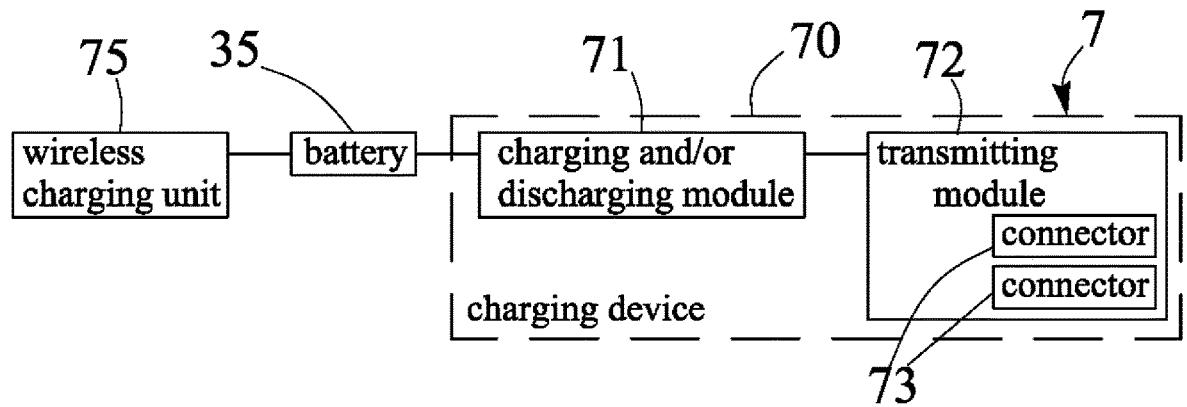
FIG. 8 is another block diagram illustrating the charging device of the carrying bag.
Figure 9:
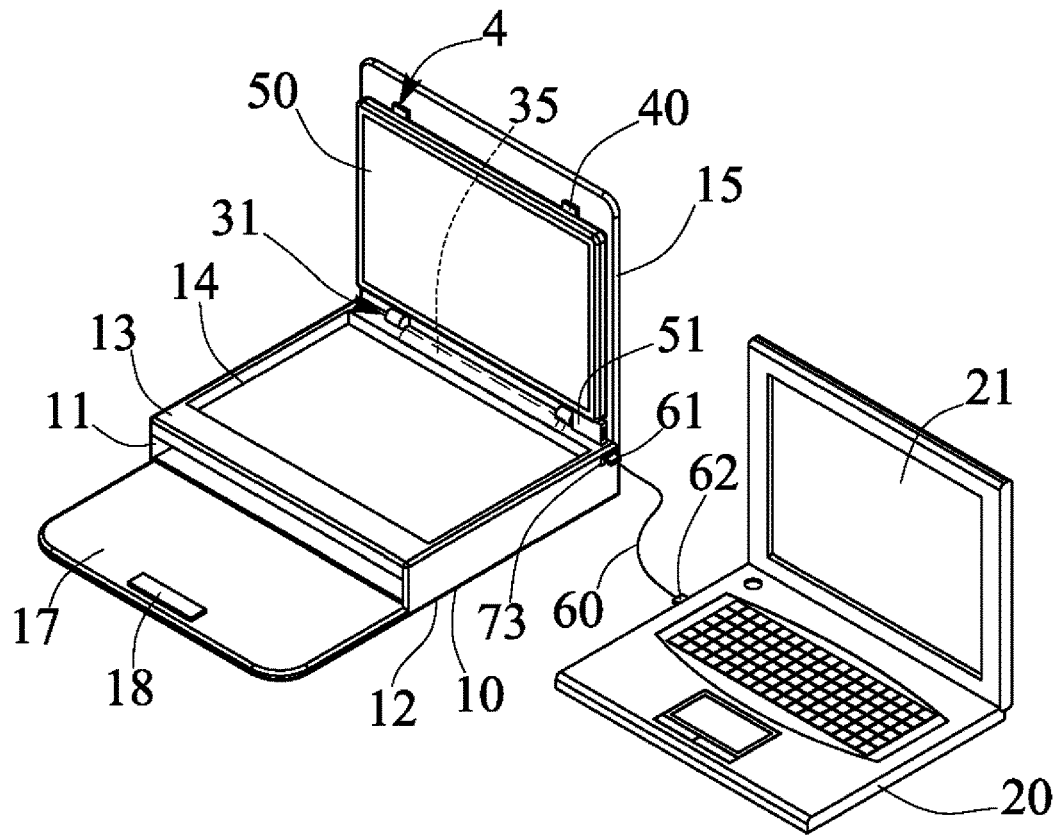
FIG. 9 is a still further perspective view illustrating the application of the carrying bag for mobile device.

As shown in the drawing figures, a power supply or battery 35 may further be provided and disposed or engaged into the chamber 11 of the housing 10, and preferably disposed or engaged between the extensions 33 of the base plate 30, and as shown in FIGS. 7-8, a charging device 7 may further be provided and also disposed or engaged into the chamber 11 of the housing 10, and electrically connected or coupled to the power supply or battery 35, the charging device 7 includes a wire or cable charging unit 70 having a charging and/or discharging module 71 electrically connected or coupled to the power supply or battery 35, and a transmitting module 72 electrically connected or coupled to the charging and/or discharging module 71, and the transmitting module 72 includes one or more (such as two) terminals or connectors 73 for selectively and electrically connecting or coupling to the mobile device 20 (FIG. 9) for selectively charging the mobile device 20.

The connectors 73 may be selected from a USB, mini-USB, micro-USB or the like. The power supply or battery 35 may be selected from a tube form battery, an ultra-thin flat battery, or a lithium battery, or the like. The charging device 7 further includes a wireless charging unit 75 or a wireless charger 75, such as a wire or coil or antenna or the like, received or engaged in the chamber 11 of the housing 10, and electrically connected or coupled to the power supply or battery 35, for selectively charging the power supply 35, and/or for selectively and electrically connecting or coupling to the mobile device 20 and for selectively charging the mobile device 20 wirelessly when the mobile device 20 is received or engaged in the chamber 11 of the housing 10, and/or when the mobile device 20 is removed or disengaged from the chamber 11 of the housing 10 and electrically connected or coupled to the terminal or connector 51 of the display 50 with the connecting cable 60.

Accordingly, the package or suitcase or carrying bag for mobile device in accordance with the present invention includes an improved supporting shelf or placement rack for accommodating or receiving or supporting the displayer or the screen or the mobile device or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrying bag comprising:
   a) a housing including a base wall and an upper wall, and a cover panel extending from said upper wall and foldable relative to said upper wall and movable toward said upper wall,
   b) a base plate engaged in said housing,
   c) a placement rack foldably attached to said base plate with a hinge device, and said placement rack being foldable relative to said base plate and said housing,
   d) a display attached to said placement rack and movable relative to said upper wall between an upwardly working position and a downwardly folded storing position, and
   e) a power supply engaged in said housing, and
   f) a charger engaged in said housing.

2. The carrying bag as claimed in claim 1, wherein said charger includes at least one of a charging and discharging module.

3. The carrying bag as claimed in claim 2, wherein said charger includes a transmitting module.

4. The carrying bag as claimed in claim 1, wherein said charger includes a wireless charging unit.

5. The carrying bag as claimed in claim 1, wherein said housing includes a chamber formed therein and defined by a base wall and said upper wall, a mobile device is selectively receivable and engageable into said chamber of said housing.

6. The carrying bag as claimed in claim 5, wherein said housing includes a flap extended from said base wall and foldable relative to said base wall for covering said chamber of said housing selectively, and said housing includes a lock device attached to said cover panel, and a lock member attached to said flap for selectively engaging with said lock device of said cover panel and for coupling said cover panel and said flap together.

7. The carrying bag as claimed in claim 1, wherein said housing includes a depression formed in said upper wall for selectively receiving and engaging with said display when said cover panel is folded toward said upper wall.

* * * * *